United States Patent
Chen et al.

(10) Patent No.: US 9,075,613 B2
(45) Date of Patent: Jul. 7, 2015

(54) LOW POWER CONSUMPTION CIRCUIT AND METHOD FOR REDUCING POWER CONSUMPTION

(75) Inventors: Hsin-Chung Chen, Hsinchu (TW); Chia-Jen Chang, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 436 days.

(21) Appl. No.: 13/278,329

(22) Filed: Oct. 21, 2011

(65) Prior Publication Data

US 2012/0221876 A1    Aug. 30, 2012

(30) Foreign Application Priority Data

Feb. 24, 2011    (TW) ................ 100106230 A

(51) Int. Cl.
*G06F 1/32* (2006.01)
*G06F 1/26* (2006.01)

(52) U.S. Cl.
CPC .............. *G06F 1/3296* (2013.01); *G06F 1/324* (2013.01); *G06F 1/26* (2013.01); *Y02B 60/1217* (2013.01); *Y02B 60/1285* (2013.01)

(58) Field of Classification Search
CPC ........ G06F 1/26; G06F 1/324; Y02B 60/1217
USPC ........................................................ 713/323
See application file for complete search history.

(56) References Cited

U.S. PATENT DOCUMENTS

| | | | |
|---|---|---|---|
| 5,504,908 A | 4/1996 | Ikeda et al. | |
| 6,304,978 B1 * | 10/2001 | Horigan et al. | 713/322 |
| 6,345,364 B1 * | 2/2002 | Lee | 713/324 |
| 7,050,049 B2 * | 5/2006 | Byun | 345/211 |
| 7,554,384 B2 * | 6/2009 | Dibene et al. | 327/535 |
| 8,098,242 B2 * | 1/2012 | Chen et al. | 345/212 |

(Continued)

FOREIGN PATENT DOCUMENTS

CN    101470512 A    7/2009

(Continued)

OTHER PUBLICATIONS

"Audio Power Amplifier Techniques With Energy Efficient Power Conversion"—Ph.D. Thesis from Karsten Nielson, Dated Apr. 30, 1998; 3 pages.*
Taiwan Patent Office, "Office Action", Nov. 27, 2013.
China Patent Office, "Office Action", Mar. 21, 2014.

*Primary Examiner* — Brian Misiura
(74) *Attorney, Agent, or Firm* — WPAT, PC; Justin King

(57) ABSTRACT

An exemplary low power consumption circuit includes a microprocessor, a power supply switch module and a main circuit module. The microprocessor is capable of outputting a power control signal and changing a pulse characteristic of the power control signal when the microprocessor switches from a first working mode to a second working mode. The power supply switch module is capable of outputting a power supply signal. The power supply switch module is electrically coupled to the microprocessor to receive the power control signal and thereby modulates a duty cycle of the power supply signal according to a change of the pulse characteristic of the power control signal. The main circuit module is electrically coupled to the power supply switch module to receive the power supply signal and operative with energy provided by the power supply signal. Moreover, a method for reducing power consumption is also provided.

7 Claims, 3 Drawing Sheets

(56) References Cited

U.S. PATENT DOCUMENTS

| | | | |
|---|---|---|---|
| 8,412,923 B2 * | 4/2013 | Carroll et al. | 713/100 |
| 8,447,275 B2 * | 5/2013 | Dearborn | 455/413 |
| 2009/0027348 A1 * | 1/2009 | Li et al. | 345/172 |
| 2011/0001744 A1 | 1/2011 | Chen et al. | |

FOREIGN PATENT DOCUMENTS

| | | |
|---|---|---|
| TW | 192623 | 10/1992 |
| TW | 416030 | 12/2000 |
| TW | 528942 | 4/2003 |

* cited by examiner

LOW POWER CONSUMPTION CIRCUIT AND METHOD FOR REDUCING POWER CONSUMPTION

TECHNICAL FIELD

The disclosure generally relates to a low power consumption circuit and a method for reducing power consumption.

BACKGROUND

With the rapid development of electronics technology, electronic devices such as computers and mobile phones have become an indispensable part of life for modern people. The various parts of a computer, such as compact disc driver, graphics card, monitor, sound card and headset would consume large power in the course of standby, the problem of energy waste is caused. Therefore, how to reduce power consumption of the electronic devices is becoming an urgent topic to be solved.

In recent years, the power saving technology for electronic device has gradually developed. At present, most electronic devices generally adopt power saving modes to reduce the power consumption, and the electronic devices in the power saving modes will set a register provided by a microprocessor to be an idle mode, so that power consumption of circuits of the electronic devices can be reduced consequently. In order to meet the current trend of high environmental awareness and demands of related laws and regulations, especially when the power saving criterion of the electronic devices requires higher standard for power consumption, the microprocessor could not satisfy the criterion even if entering into the idle mode.

SUMMARY OF EMBODIMENTS

Accordingly, in order to reduce power consumption and decrease the energy waste, the disclosure is directed to a low power consumption circuit and a method for reducing power consumption.

More specifically, a low power consumption circuit in accordance with an embodiment of the present disclosure includes a microprocessor, a power supply switch module and a main circuit module. The microprocessor is capable of outputting a power control signal and changing a pulse characteristic of the power control signal when the microprocessor switches from a first working mode to a second working mode. The power supply switch module is capable of outputting a power supply signal, and is electrically coupled to the microprocessor to receive the power control signal and thereby modulates a duty cycle of the power supply signal according to a change of the pulse characteristic of the power control signal. The main circuit module is electrically coupled to the power supply switch module to receive the power supply signal and operative with energy provided by the power supply signal.

In other embodiments, the first working mode and the second working mode respectively may be different two of the group consisting of a normal mode, and an idle mode. The pulse characteristic may include a pulse width or a pulse frequency. The power supply switch module may include a power metal-oxide-semiconductor (MOS) transistor.

In one embodiment, the microprocessor may include a general purpose input/output (GPIO) interface, and the power supply switch module is electrically coupled to the general purpose input/output interface to receive the power control signal.

A method for reducing power consumption in accordance with another embodiment of the present disclosure includes the following steps of: outputting a power control signal from a microprocessor; changing a pulse characteristic of the power control signal when the microprocessor switches from a first working mode to a second working mode; modulating a duty cycle of a power supply signal according to a change of the pulse characteristic of the power control signal; and receiving the power supply signal by a main circuit module so that the main circuit module is operative with energy provided by the power supply signal.

In other embodiments, in the method for reducing power consumption, the second working mode may be an idle mode. The pulse characteristic may include a pulse width or a pulse frequency. The power switch module may include a power MOS transistor. The microprocessor may output the power control signal through a general purpose input/output interface thereof.

In summary, the low power consumption circuit and the method for reducing power consumption change the pulse characteristic of the power control signal when the microprocessor changes its working mode, and thereby modulate the duty cycle of the power supply signal outputted from the power supply switch module and make the main circuit module be operative with energy provided by the power supply signal. Herein, different duty cycles of the power supply signal represent different energy supplies, so that the purpose of effectively reducing power consumption and decreasing energy waste can be readily achieved by modulating (i.e., decreasing) the duty cycle of the power supply signal, and the power saving criterion of high standard is satisfied.

Other objectives, features and advantages of the disclosure will be further understood from the further technological features disclosed by the embodiments of the disclosure wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which are shown by way of illustration specific embodiments in which the disclosure may be practiced. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Accordingly, the descriptions will be regarded as illustrative in nature and not as restrictive.

Figure 1:
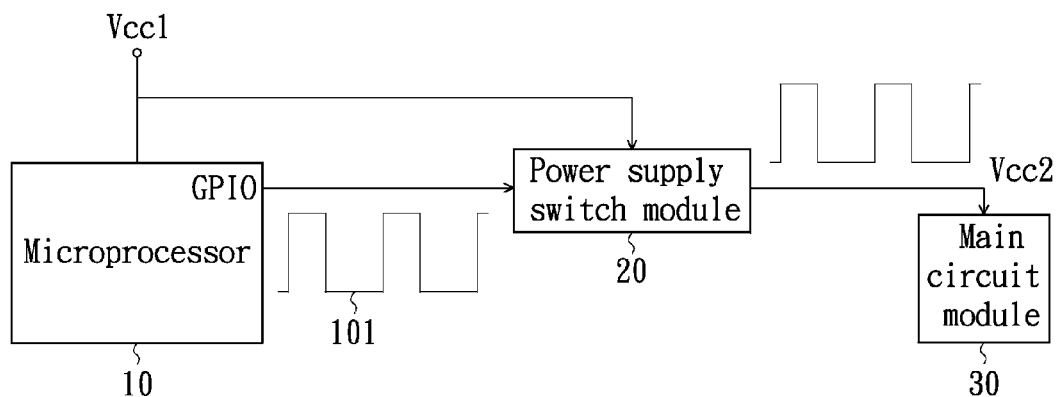
FIG. 1 shows a schematic circuit block diagram of a low power consumption circuit in accordance with an exemplary embodiment.

Referring to FIG. 1, showing a schematic circuit block diagram of a low power consumption circuit in accordance with an exemplary embodiment of the present disclosure. In this exemplary embodiment, the low power consumption circuit includes a microprocessor 10, a power supply switch module 20 and a main circuit module 30.

As shown in FIG. 1, the microprocessor 10 is electrically coupled to a power supply voltage Vcc1 as power supply. The microprocessor 10 includes a general purpose input/output interface GPIO which is electrically coupled to the power supply switch module 20 to output a power control signal 101. The general purpose input/output interface GPIO outputs the power control signal 101 with different pulse characteristics for example, different pulse widths or different pulse frequencies when the microprocessor 10 works in different modes.

The power supply switch module 20 is electrically coupled to the power supply voltage Vcc1. The power supply switch module 20 is further electrically coupled to the general purpose input/output interface GPIO of the microprocessor 10 to receive the power control signal 101, and subjected to the control of the power control signal 101 to generate a power supply signal Vcc2. Herein, a voltage amplitude of the power supply signal Vcc2 is determined by the power supply voltage Vcc1, and a duty cycle of the power supply signal Vcc2 is determined by the power control signal 101. In this exemplary embodiment, the power supply switch module 20 can be a power metal-oxide-semiconductor (MOS) transistor, such as a p-channel metal oxide semiconductor (PMOS) transistor, an n-channel metal oxide semiconductor (NMOS) transistor, or any other type of power supply switch module.

The main circuit module 30 is electrically coupled to the power supply switch module 20 to receive the power supply signal Vcc2 and operative with the energy provided by the power supply signal Vcc2. Herein, the main circuit module 30 may be a load circuit module of a south bridge chipset and/or a north bridge chipset. Because different duty cycles of the power supply signal Vcc2 represent different energy supplies, the purpose of changing (i.e., reducing) power consumption of the main circuit module 30 can be achieved by the power control signal 101 modulating (i.e., decreasing) the duty cycle of the power supply signal Vcc2.

Figure 2:
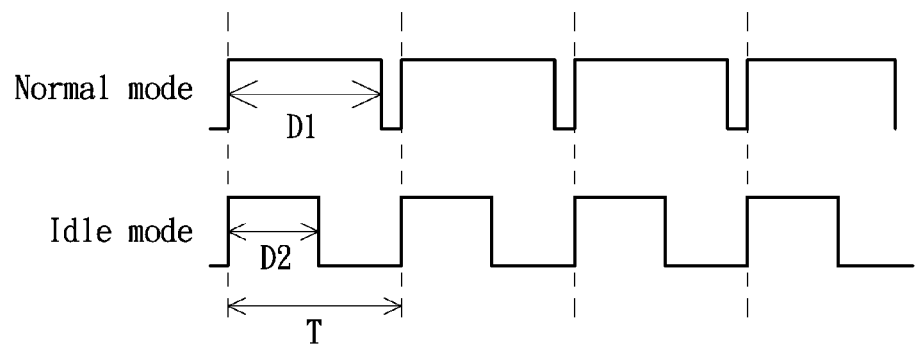
FIG. 2 shows PWM (pulse width modulation) waveforms of a power control signal when the microprocessor in FIG. 1 works in a first mode and a second mode respectively.

Referring to FIG. 1 and FIG. 2, FIG. 2 shows PWM (pulse width modulation) waveforms of the power control signal 101 when the microprocessor 10 in FIG. 1 works in a first working mode and a second working mode respectively. Herein, the first working mode and the second working mode respectively are different two of a normal mode, and an idle mode. In other words, the microprocessor 10 can switch between any two different working modes. FIG. 2 as an example shows PWM waveforms of the power control signal 101 when the first working mode is the normal mode and the second working mode is the idle mode, but the disclosure is not to be limited to the above-mentioned example. As shown in FIG. 1 and FIG. 2, when the microprocessor 10 works in the normal mode, a frequency period of the power control signal 101 is T, the duty cycle of the power control signal 101 is equal to (D1/T) which is greater than 50% (i.e., 90%). Where D1 is a time length of logic high level in a single frequency period T, i.e., enable period. In this exemplary embodiment, if the power supply switch module 20 is an NMOS transistor, in the enable period D1 of the power control signal 101, the power supply switch module 20 is turned on, and the power supply signal Vcc2 provides energy to the main circuit module 30 for use. On the contrary, in the disable period of the power control signal 101, the power control signal 101 is at logic low level correspondingly, the power supply switch module 20 is turned off, and the power supply signal Vcc2 stops providing energy to the main circuit module 30. Thus, because the energy provided by the power supply signal Vcc2 is determined by the duty cycle of the power supply signal Vcc2 on the prerequisite of that the power supply voltage Vcc1 keeps unchanged, the amount of energy provided to the main circuit module 30 by the power supply signal Vcc2 can be determined by the power control signal 101 controlling the power supply switch module 20.

When the microprocessor 10 switches from the normal mode to the idle mode, the frequency period of the power control signal 101 maintains as T, but the duty cycle of the power control signal 101 is changed from (D1/T) in the normal mode to (D2/T) in the idle mode, where D2 is a time length of logic high level occupied in a single frequency period T, i.e., enable period. The duty cycle (D2/T) in the idle mode is less than the duty cycle (D1/T) in the normal mode, and for example, (D2/T) is equal to 50%. Because the duty cycle of the power control signal 101 is changed from (D1/T) to (D2/T), that is, the duty cycle of the power control signal 101 decreases, the duty cycle of the power supply signal Vcc2 modulated by the power control signal 101 is decreased correspondingly, so that the energy provided to the main circuit module 30 by the power supply signal Vcc2 is also reduced correspondingly. As a result, the main circuit module 30 would consume relatively lower power when the microprocessor 10 works in the idle mode.

In addition, it needs to be explained that the duty cycle of (D1/T) and (D2/T) are not limited to the above examples, different working modes may have different duty cycles, and even in the same working mode, the duty cycle may also change with different design requirements.

Figure 3:
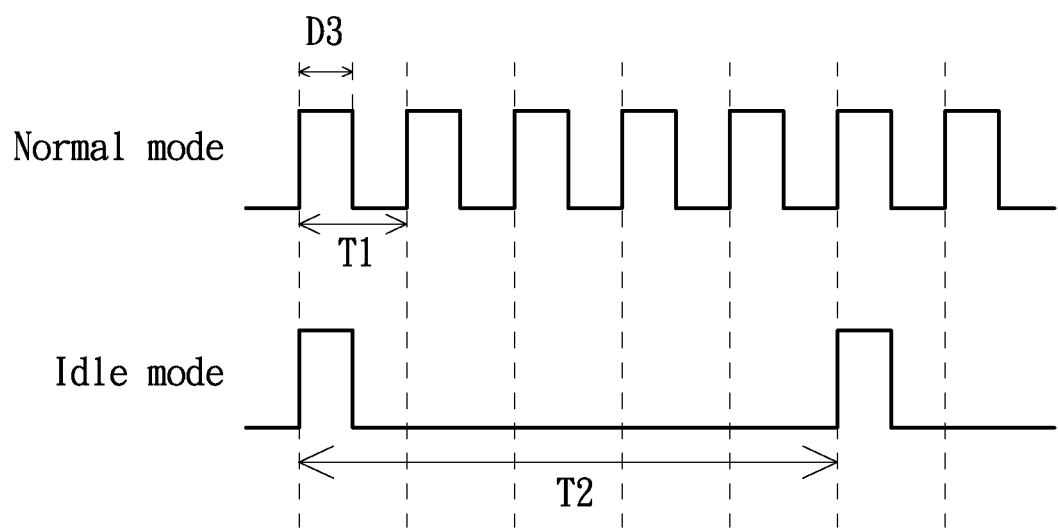
FIG. 3 shows PFM (pulse frequency modulation) waveforms of a power control signal when the microprocessor in FIG. 1 works in a first mode and a second mode respectively.

Referring to FIG. 1 and FIG. 3, FIG. 3 shows PFM (pulse frequency modulation) waveforms of the power control signal 101 when the microprocessor 10 works in the first working mode and the second working mode respectively in accordance with another exemplary embodiment. In detail, FIG. 3 shows PFM waveforms of the power control signal 101 when the first working mode is the normal mode and the second working mode is the idle mode, but the disclosure is not to be limited to the above-mentioned example. As shown in FIG. 1 and FIG. 3, when the microprocessor 10 works in the normal mode, a frequency period of the power control signal 101 is T1, and a duty cycle of the power control signal 101 is (D3/T1) (i.e., equal to 60%). Where D3 is a time length of logic high level occupied in a single frequency period T1, i.e., enable period. Likewise, if the power supply switch module 20 is an NMOS transistor, in the enable period D3 of the power control signal 101, the power supply switch module 20 is turned on, and the power supply signal Vcc2 provides energy to the main circuit module 30 for use. If the power control signal 101 is in disable period (i.e., the power control signal 101 is at logic low level correspondingly), the power supply switch module 20 is turned off, and the power supply signal Vcc2 stops providing energy to the main circuit module 30. Thus, since the energy provided by the power supply signal Vcc2 is determined by the duty cycle of the power supply signal Vcc2 on the prerequisite of that the power supply voltage Vcc1 keeps unchanged, the amount of energy supplied to the main circuit module 30 by the power supply signal Vcc2 can be determined by the power control signal 101 controlling the power supply switch module 20.

When the microprocessor 10 switches from the normal mode to the idle mode, the frequency period of the power control signal 101 is changed from T1 to T2, and the duty cycle of the power control signal 101 changes to be (D3/T2) (i.e., 12%) correspondingly. Thus, although both the frequency periods T1 and T2 have the same enable period D3, the increase of frequency period of the power control signal 101 makes the duty cycle of the power control signal 101 decrease, the duty cycle of the power supply signal Vcc2 modulated by the power control signal 101 is decreased correspondingly, so that the energy provided to the main circuit module 30 by the power supply signal Vcc2 would also be reduced correspondingly. As a result, the main circuit module 30 would consume relatively lower power when the microprocessor 10 works in the idle mode.

In addition, it needs to be explained that the duty cycles (D3/T1) and (D3/T2) are not limited to the above examples, different working modes may have different duty cycles, and even in the same working mode, the duty cycle may also change with different design requirements.

In addition, it needs to be explained that the above-mentioned embodiments take the microprocessor 10 switching from the normal mode to the idle mode as an example, but the disclosure is not limited to the above-mentioned embodiments. The microprocessor 10 can switch between any two different working modes, in order to achieve purpose of changing the power consumption of the main circuit module 30.

Figure 4:
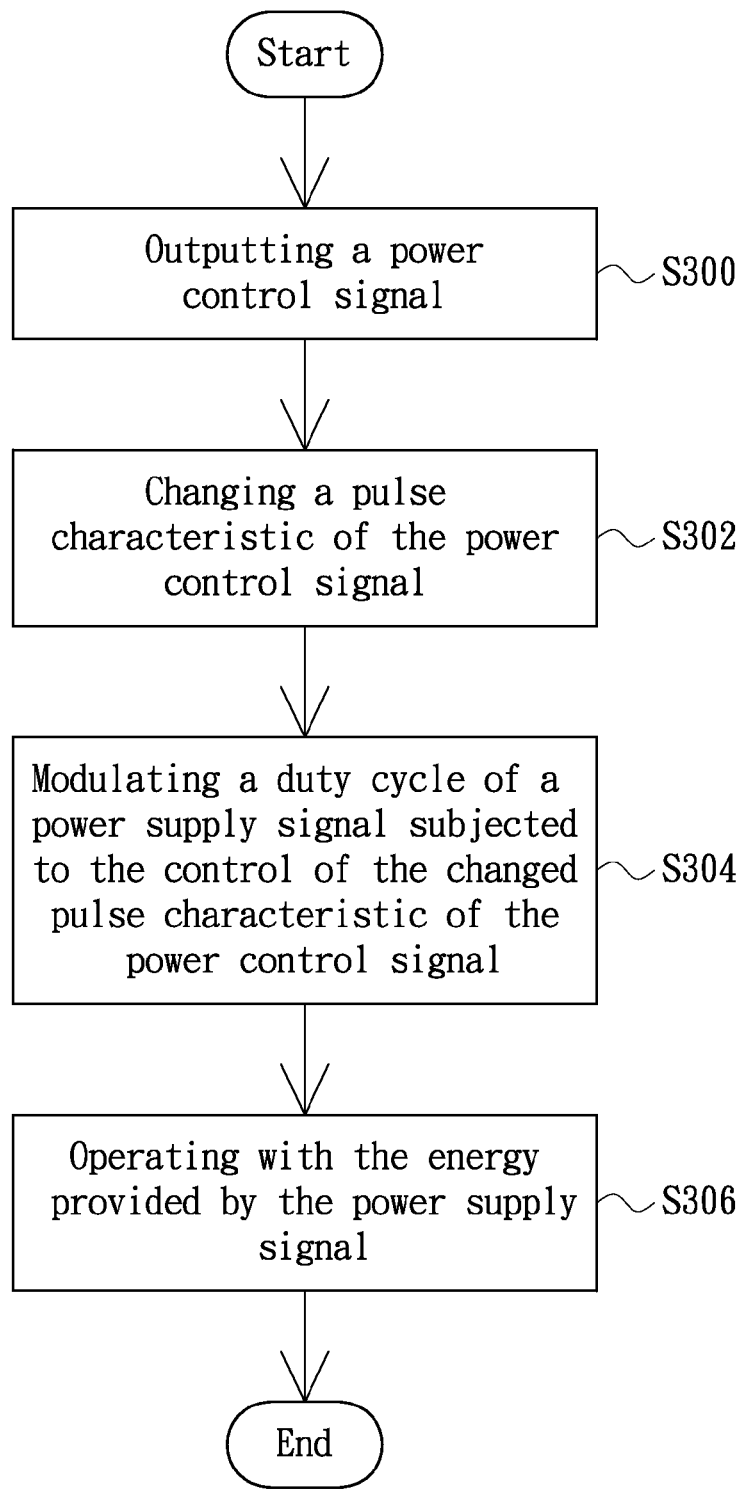
FIG. 4 shows a flow chart of a method for reducing power consumption in accordance with an exemplary embodiment.

Referring to FIG. 1 and FIG. 4, FIG. 4 shows a flow chart of a method for reducing power consumption in accordance with an exemplary embodiment. The method for reducing power consumption provided in this exemplary embodiment primarily includes the following steps S300, S302, S304 and S306:

In step S300, the microprocessor 10 outputs the power control signal 101. For example, the PWM and PFM waveforms of the power control signal 101 outputted from the microprocessor 10 when works in the normal mode in accordance with different embodiments can refer to FIG. 2 and FIG. 3 respectively.

In step S302, when the microprocessor 10 switches from the first working mode (i.e., the normal mode) to the second working mode (i.e., the idle mode), the microprocessor 10 changes a pulse characteristic of the power control signal 101. Herein, the pulse characteristic may include a pulse width or a pulse frequency. When the microprocessor 10 changes to work in the idle mode, the changed pulse width and pulse frequency waveforms of the power control signal 101 in accordance with different embodiments can refer to FIG. 2 and FIG. 3 respectively.

In step S304, the power supply switch module 20 receives the changed pulse characteristic of the power control signal 101 to modulate the duty cycle of the power supply signal Vcc2. It is found from the PWM and PFM waveforms of the power control signal 101 respectively as shown in FIG. 2 and FIG. 3, when the microprocessor 10 works in the idle mode, the duty cycle of the power control signal 101 decreases correspondingly, so that the power supply signal Vcc2 modulated by the power control signal 101 decreases consequently.

In step S306, the main circuit module 30 receives the power supply signal Vcc2 and thereby is operative with energy provided by the power supply signal Vcc2. In detail, because different duty cycles of the power supply signal Vcc2 represent different energy supplies, different duty cycles of the power supply signal Vcc2 received by the main circuit module 30 would make the main circuit module 30 operate in different power consumption modes.

In an exemplary embodiment, a comparison experiment is carried out to compare the effect of the low power consumption circuit and the method for reducing power consumption of the disclosure with that the conventional idle technology of the microprocessor. It can be obtained from the experiment that currents flowing through the main circuit module 30 when the microprocessor 10 using the conventional idle technology is in the normal mode and the idle mode are 18.45 mA and 13.97 mA respectively, the amount of saved current is 4.48 mA (i.e., 18.45 mA-13.97 mA) when the microprocessor switches from the normal mode to the idle mode associated with the conventional technology, such amount of saved current could not accord with the high standard power saving criterion.

However, the various embodiments of the disclosure control the pulse characteristic of the power control signal 101 (as shown in FIG. 2 and FIG. 3) when the microprocessor 10 changes to the idle mode and thereby modulates the duty cycle of the power supply signal Vcc2, so that the current flowing through the main circuit module 30 when the microprocessor 10 is in the idle mode is about 9.79 mA (corresponding to the current flowing through the main circuit module 30 when the microprocessor 10 is in the normal mode is 18.45 mA), and thus the amount of saved current when the microprocessor 10 switches from the normal mode to the idle mode associated with the disclosure is 8.66 mA (i.e., 18.45 mA-9.79 mA). As a result, the power consumption is dramatically improved, and can satisfy the high standard power saving criterion.

In summary, compared with the conventional technology, the low power consumption circuit and the method for reducing power consumption of the disclosure modulate the duty cycle of the power control signal 101 by the microprocessor 10 switching from the first working mode to the second working mode, so as to modulate (i.e., decrease) the duty cycle of the power supply signal Vcc2 outputted from the power supply switch module 20 and allow the main circuit module 30 to be operative with the energy provided by the power supply signal Vcc2. Different duty cycles of the power supply signal Vcc2 would represent different energy supplies, and therefore the power consumption of the main circuit module 30 can be changed consequently.

Aiming at the problem of the conventional technology that the power consumption of the main circuit module requires high standard and would not accord with the high standard power saving criterion even if the microprocessor 10 enters into the conventional idle mode, the disclosure controls the duty cycle of the power control signal 101 by the microprocessor 10 in the idle mode to be decreased to a certain setting value, so as to make the duty cycle of the power supply signal Vcc2 be reduced to a preset value correspondingly. Accordingly, the power consumption of the main circuit module 30 associated with the disclosure can be reduced to accord with the high standard power saving criterion.

For convenience of understanding the low power consumption circuit and method for reducing power consumption of the disclosure, an electromagnetic touch module taken as an example of the main circuit module 30 of FIG. 1 would be described below in detail with reference to FIG. 1.

Specifically, the electromagnetic touch module is configured (i.e., structured and arranged) for processing commands and/or information inputted by a user through an electromagnetic stylus and generating corresponding touch results. In this exemplary embodiment, the electromagnetic touch module is electrically coupled to the power supply switch module 20 to receive the power supply signal Vcc2 and operates with the energy delivered by the received power supply signal Vcc2 for touch operation to receive the input of user and thereby generate corresponding touch results. The amount of the energy delivered by the power supply signal Vcc2 is determined by the power control signal 101 outputted from the GIPO interface of the microprocessor 10. As above mentioned, as the microprocessor 10 operates at different working modes, the pulse characteristics of the power control signal 101 outputted from the GPIO interface of the microprocessor 10 are different correspondingly. For example, the pulse width or the pulse frequency is changed, so that the duty cycle of the power control signal 101 is varied consequently. Advantageously, the duty cycle of the power control signal 101 in this exemplary embodiment is in the range of 30%-70% to achieve better touch effect. If the duty cycle is excessively large, which would cause degraded effect of power saving, and if the duty cycle is excessively small, which would result in the power supply of system being abnormal.

When the microprocessor 10 is switched from a current working mode (e.g., the above-described normal mode) to an idle mode, the duty cycle of the power control signal 101 outputted from the GPIO interface is decreased, the energy delivered to the electromagnetic touch module via the power supply signal Vcc2 provided by the power supply switch module 20 is decreased correspondingly under the control of the power control signal 101, the electromagnetic touch module enters into a sleep state. In this exemplary embodiment, the electromagnetic touch module in the sleep state still can respond to the input of user, so that the drawback in the prior art of no response to the input of electromagnetic stylus during the microprocessor 10 in the idle mode can be overcome and the user can use the electromagnetic stylus to wake up the electromagnetic touch module from the sleep state. As a result, the operation convenience of user is improved. Herein, when the electromagnetic touch module is waked up from the sleep state, the microprocessor 10 for example would be switched to the normal mode, the power supply switch module 20 correspondingly adjusts the energy delivered by the power supply signal Vcc2 under the control of the power control signal 101 to meet the energy requirement of the electromagnetic touch module out of the sleep state.

In short, the exemplary embodiment modulates the duty cycle of the power supply signal Vcc2 outputted from the power supply switch module 20 by the microprocessor 10, and the microprocessor 10 changes the pulse characteristic of the power control signal 101 during working mode switching, so as to provide necessary energy to the electromagnetic touch module for touch operation. Different duty cycle of the power supply signal Vcc2 represents different delivered energy. Accordingly, by modulating (e.g., decreasing) the duty cycle of the power supply signal Vcc2, the power supply switch module 20 can be intermittently switched on and off to save power, the purpose of overcoming the drawback of the inherent power saving mode of the microprocessor in the prior art unable to meet the power saving requirement can be achieved consequently.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A low power consumption circuit comprising:
    a microprocessor, electrically coupled to a power supply voltage and for outputting a power control signal and changing one of a first pulse width or a first pulse frequency of the power control signal when the microprocessor switches from a first working mode to a second working mode;
    a power supply switch module, electrically coupled to the power supply voltage and separately coupled to the microprocessor and for receiving the power control signal and outputting a power supply signal with one of a second pulse width or a second pulse frequency set according to one of said first pulse width or said first pulse frequency; and
    a main circuit module, electrically coupled to the power supply switch module and powered by the power supply signal,
    wherein said microprocessor is separately coupled to said power supply voltage and said power supply switch module.

2. The low power consumption circuit as claimed in claim 1, wherein the first working mode and the second working mode respectively are different two of the group consisting of a normal mode, and an idle mode.

3. The low power consumption circuit as claimed in claim 1, wherein the microprocessor comprises a general purpose input/output interface, and the power supply switch module is electrically coupled to the general purpose input/output interface to receive the power control signal.

4. The low power consumption circuit as claimed in claim 1, wherein the power supply switch module comprises a power metal-oxide-semiconductor (MOS) transistor.

5. A method for reducing power consumption, comprising:
    outputting a power control signal from a microprocessor;
    changing one of a first pulse width or a first pulse frequency of the power control signal when the microprocessor switches from a first working mode to a second working mode;
    outputting a power supply signal with one of a second pulse width or a second pulse frequency set from a power supply switch module according to said first pulse width or said first pulse frequency; and
    receiving the power supply signal by a main circuit module so that the main circuit module is operative with energy provided by the power supply signal,
    wherein said microprocessor is separately coupled to said power supply voltage and said power supply switch module.

6. The method for reducing power consumption as claimed in claim 5, wherein the second working mode is an idle mode.

7. The method for reducing power consumption as claimed in claim 5, wherein the microprocessor is capable of outputting the power control signal through a general purpose input/output interface of the microprocessor.

* * * * *